United States Patent [19]

Husa

[11] 3,860,890

[45] Jan. 14, 1975

[54] TEMPERATURE STABLE RC OSCILLATOR

[75] Inventor: Ronald G. Husa, Albuquerque, N. Mex.

[73] Assignee: The United States of America as represented by the United States Atomic Energy Commission, Washington, D.C.

[22] Filed: Jan. 2, 1974

[21] Appl. No.: 430,312

[52] U.S. Cl. .............................. 331/111, 331/113 R

[51] Int. Cl. .............................................. H03k 3/282

[58] Field of Search ....... 331/108 D, 111, 113, 143, 331/144; 307/291

[56] References Cited

UNITED STATES PATENTS 3,696,311 10/1972 Dushige .............................. 331/113

*Primary Examiner*—John Kominski
*Attorney, Agent, or Firm*—John A. Horan; Dudley W. King; Richard E. Constant

[57] ABSTRACT

A temperature stable, free running oscillator which includes first and second transistors with the collector of the first transistor connected directly to the base of the second transistor, and the base of the first transistor coupled through a capacitor to the collector of the second transistor and through a resistor to the emitter of the second transistor; resistors connected between the collectors of the transistors to a voltage bias; and resistors connected between the emitters of the transistors to ground. A buffer amplifier may be connected to the emitter of the second transistor to provide a uniform, square wave output signal.

6 Claims, 1 Drawing Figure

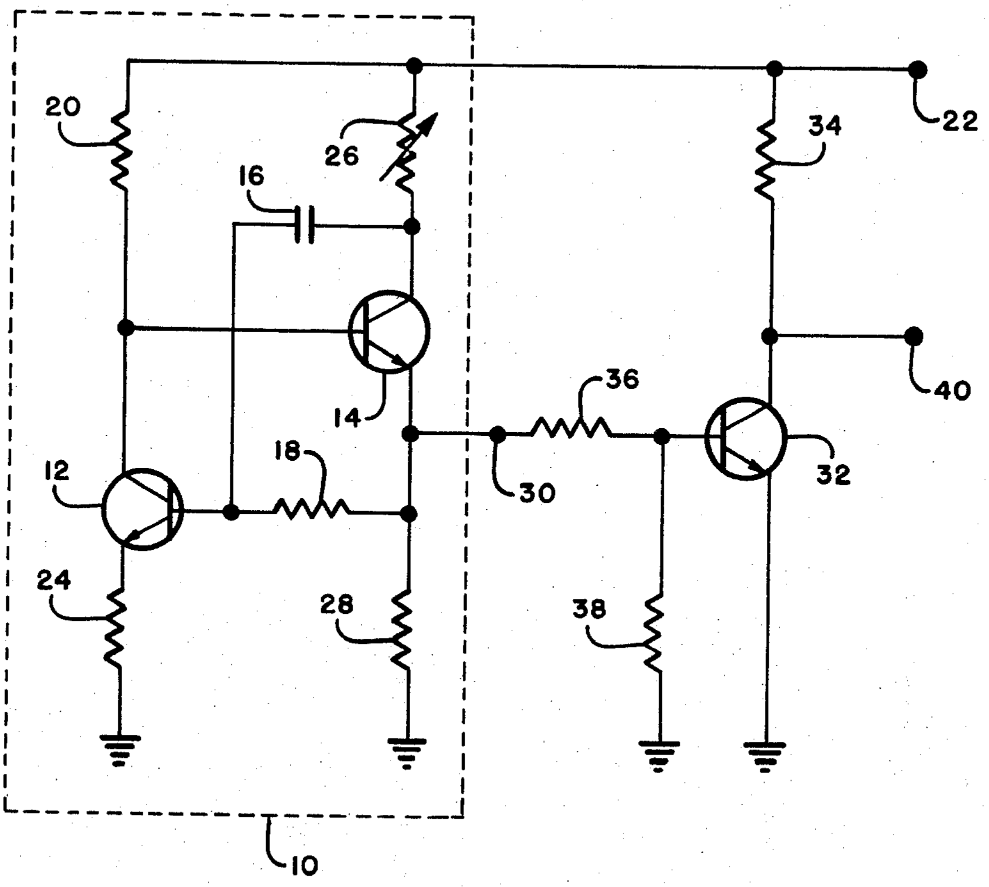
20
26
16
34
22
14
36
40
12
18
30
32
24
28
38
10

TEMPERATURE STABLE RC OSCILLATOR

BACKGROUND OF INVENTION

It is difficult to provide an RC type transistor oscillator having an output signal which is substantially independent of temperature, such as over temperature ranges as broad as from about −55° to 80°C. Over such a temperature range, most prior oscillator frequencies would change drastically from their norm as the temperature changed in one direction or another. Attempts have been made to provide temperature stable oscillators over limited temperature ranges but have not been successful over these temperature ranges. In addition, many of these oscillators are complex and use components which are not readily adaptable to hybridizing into small packages. In addition, many of these prior oscillators were not self-starting.

SUMMARY OF INVENTION

In view of the above, it is an object of this invention to provide a temperature stable, free running oscillator.

It is a further object of this invention to provide a temperature stable, free running oscillator which is absolutely self-starting.

It is a still further object of this invention to provide a temperature stable oscillator which is of simple design having minimum components and utilizing only one capacitor.

Various other objects and advantages will appear from the following description of the invention, and the most novel features will be particularly pointed out hereinafter in connection with the appended claims. It will be understood that various changes in the details, and arrangements of the parts, which are herein described and illustrated in order to explain the nature of the invention, may be made by those skilled in the art.

The invention relates to a temperature stable, free running oscillator having first and second transistors directly connected between the collector of the first transistor and the base of the second transistor, a temperature stable timing capacitor connected between the base of the first transistor and the collector of the second transistor, a discharge resistor connected between the base of the first transistor and the emitter of the second transistor, and biasing resistors coupling the emitters to ground and the collectors to a bias voltage.

DESCRIPTION OF DRAWING

The invention is illustrated in the accompanying drawing by the circuit diagram illustrating the relative locations and interconnecting of the various components comprising this oscillator connected to provide a square wave signal output.

DETAILED DESCRIPTION

The temperature stable, free running oscillator 10 of this invention includes a first transistor 12 and a second transistor 14 which are directly coupled between the collector of transistor 12 and the base of transistor 14. The transistors are shown as NPN transistors, but it is understood that PNP transistors may be utilized with appropriate biasing provided. The base of transistor 12 is coupled to the collector of transistor 14 through a timing capacitor 16 and to the emitter of transistor 14 through a discharge resistor 18. The transistor 12 may be suitably biased, such as by connecting a resistor 20 between collector and a biasing terminal 22 and by connecting a resistor 24 betwwen the emitter and ground. Transistor 14, in turn, may be suitable biased by connecting a charging resistor 26 between collector and biasing terminal 22 and a resistor 28 between the emitter and ground. Resistor 26 also functions to control one half of the duty cycle or oscillator period of oscillator 10 and thus may be a variable resistor, as shown, so as to provide a trimming or adjustment control of the oscillator duty cycle. The oscillator 10 output may be derived from terminal 30 which is coupled to the emitter of transistor 14.

The timing capacitor 16 together with resistor 18 controls the length or period of one half of the duty cycle while the capacitor 16 with resistor 26 controls the other half of the duty cycle. Oscillator 10 is self-starting because in the direct current case, neither transistor 12 nor transistor 14 can be saturated. Transistor 12's base drive is derived from the output of transistor 14's emitter and transistor 14's base drive is derived from transistor 12's collector. Thus, the direct feedback provided assures that transistor 12 and transistor 14 are active in the direct current case. During oscillation, transistor 12 turns transistor 14 off and the charge on capacitor 16 turns transistor 12 off when it discharges through transistor 14. Symmetry of the output wave form may be controlled by the selection of the circuit component values. For example, with component values as indicated in the following table, the oscillator may have a 50 percent duty cycle.

| | |
|---|---|
| Transistor 12 | 2N4251 |
| Transistor 14 | 2N4251 |
| Capacitor 16 | 910 picofarad |
| Resistor 18 | 2000 ohms |
| Resistor 20 | 2000 ohms |
| Resistor 24 | 200 ohms |
| Resistor 26 | 1000 ohms (variable) |
| Resistor 28 | 619 ohms |

The voltage bias applied at terminal 22 may be determined by the particular transistor types utilized and by the component values, but for the above example may typically be about 4 to 10 volts. For optimum temperature stability, it is preferred that all resistors be metal film or tantalum nitride resistors and that capacitor 16 be a ceramic capacitor, such as a commercially available NPO ceramic capacitor, or their equivalents.

As the output signal produced at terminal 30 may not be in a uniform square wave shape and as it is often desired to isolate an oscillator from its load, a buffer amplifier stage may be provided between terminal 30 and the oscillator load. For example, a transistor 32 may be connected in common emitter configuration with its emitter grounded and collector biased through resistor 34 to biasing terminal 22 and its base coupled to terminal 30 through resistor 36. A biasing resistor 38 may be connected between the base of transistor 32 and ground. The output signal may be derived from the collector of transistor 32 and coupled to an output terminal 40. The signal at terminal 40 may be a square wave varying from ground voltage to the biasing voltage at terminal 22 with a duty cycle equal to that produced at the emitter of transistor 14 by oscillator 10.

The total time (T) of a complete duty cycle of the oscillator 10 is determined by the time transistor 12 is active ($T_1$), the time transistor 12 is off ($T_2$), and the time transistor 12 is saturated ($T_3$). One half of the duty cycle is the sum of $T_1$ and $T_2$ while the other half of the duty cycle is $T_3$. With the above circuit parameters, the time periods $T_1 + T_2$ and $T_3$ were calculated and measured to be about 2 to 2.5 microseconds each.

The time period T (of the other time periods $T_1$, $T_2$ and $T_3$) may be determined using the general formula:

$$T = kC \ln(x)$$

where; $k$ = resistor 18 or a function of resistors 26, 28, 18, 20 and 24,

C = capacitor 16, and $x$ = a complex function of circuit components and circuit parameters. The various formulas or functions may be derived from analysis of the circuit. With the above circuit values and a bias voltage of 7 volts, the time period $T_1 + T_2$ may have a $k$ of about 1.82 and an $x$ of about 3.85 while the time period $T_3$ may have a $k$ of about 1.066 and an $x$ of about 6.05. It will be seen that the logarithm in these equations using circuit values listed is the logarithm of a relatively large number. It has been found that even though this number may vary with changing temperature, its logarithm does not vary significantly and as such the time periods are relatively constant. For example, using the circuit components listed above, the frequency of the signal produced by oscillator 10 at −55°, 25°, 80° and 100°C varied from 248.84 kilocycles to 248.51, 254.62 and 256.81 kilocycles with a 6 volt bias and from 249.68 to 248.36, 248.75 and 249.06 with an 8 volt bias, respectively. The frequency varied no more than 3.26 percent over this temperature range for the respective voltage biases.

It should be noted that by proper selection of the circuit components, the output signal time period may be adjusted to go up or down with changing temperature or to stay constant, depending upon the desired accuracy and operation. It has been found that for a constant or substantially constant output signal timer period over the temperature range of from about −55°C to 100°C, the resistances of resistor 26 and resistor 18 should have a ratio of about 1 to 2, the resistances of resistor 20 and resistor 24 should have a ratio of about 10 to 1, and the resistances of resistor 26 and resistor 28 should have a ratio of about 1 to 1.

Circuit frequencies may be selected by proper selection of circuit values. For example, as the values of resistors 18, 20, 24 and 26 are increased, the frequency of circuit may be decreased while an increase in resistor 28 may cause the frequency to increase. In other words, as resistor 18 is decreased transistors 12 and 14 are off for less time, as resistor 20 is decreased transistor 14 is off less time, as resistor 24 is decreased transistor 14 is off more time, as resistor 26 is decreased transistors 12 and 14 are on and off less time, and as resistor 28 is decreased, transistor 12 is on more time.

What is claimed is:

1. A temperature stable, free running oscillator comprising a first transistor having a base, collector and emitter; a second transistor having a base, collector and emitter; means for connecting the base of said second transistor directly to the collector of said first transistor; a timing capacitor coupled between the base of said first transistor and the collector of said second transistor; a discharge resistor coupled between the base of said first transistor and the emitter of said second transistor; first resistor means for coupling a bias voltage to the collectors of said first and second transistors; and second resistor means for coupling ground potential to the emitters of said first and second transistors.

2. The oscillator of claim 1 wherein said first resistor means includes a first biasing resistor connected between the collector of said first transistor and a biasing junction and a second biasing resistor connected between the collector of said second transistor and said biasing junction.

3. The oscillator of claim 2 wherein said second biasing resistor is a variable resistor.

4. The oscillator of claim 2 including a third transistor having a base, collector and emitter; a resistor coupled between the emitter of said second transistor and the base of said third transistor; means for coupling the base and emitter of said third transistor to ground; and means for coupling the collector of said third transistor and said biasing junction.

5. The oscillator of claim 2 wherein said second resistor means includes a third biasing resistor connected between the emitter of said first transistor and ground and a fourth biasing resistor connected between the emitter of said second transistor and ground.

6. The oscillator of claim 5 wherein the resistances of said second biasing resistor and said discharge resistor are at a ratio of about 1 to 2, the resistances of said first biasing resistor and said third biasing resistor are at a ratio of about 10 to 1, and the resistances of said second biasing resistor and said fourth biasing resistor are at a ratio of about 1 to 1.

* * * * *